(12) United States Patent
Yeh

(10) Patent No.: US 6,701,577 B1
(45) Date of Patent: Mar. 9, 2004

(54) BARBECUE GRILL HINGE ASSEMBLY

(76) Inventor: Jui-Ju Yeh, 14F, No. 223, Sec. 5, Nanking E. Rd., Taipei (TW)

( * ) Notice: Subject to any disclaimer, the term of this patent is extended or adjusted under 35 U.S.C. 154(b) by 0 days.

(21) Appl. No.: 10/369,500

(22) Filed: Feb. 21, 2003

(51) Int. Cl.[7] .............................................. E05D 11/06
(52) U.S. Cl. ............................. 16/376; 16/374; 16/371; 16/319; 136/194
(58) Field of Search .......................... 16/376, 319, 297, 16/300, 363, 371, 374, 343

(56) References Cited

U.S. PATENT DOCUMENTS

| | | | | | |
|---|---|---|---|---|---|
| 1,837,232 A | * | 12/1931 | Reinhardt | ..................... | 16/361 |
| 2,114,644 A | * | 4/1938 | Bennett | ..................... | 126/194 |
| 3,889,316 A | * | 6/1975 | Koike | ..................... | 16/297 |
| 4,649,599 A | * | 3/1987 | Beller | ..................... | 16/332 |
| 4,655,365 A | * | 4/1987 | Miller | ..................... | 220/314 |
| 5,791,018 A | * | 8/1998 | Yoshinobu | ..................... | 16/374 |
| 6,353,970 B1 | * | 3/2002 | Spaeth | ..................... | 16/360 |
| 6,629,337 B2 | * | 10/2003 | Nania | ..................... | 16/334 |

* cited by examiner

*Primary Examiner*—John B. Walsh
(74) *Attorney, Agent, or Firm*—Rabin & Berdo, P.C.

(57) ABSTRACT

A barbecue grill hinge assembly has a cover bracket, a body bracket and a hinge pin. The cover bracket has a cover bracket body, two curved arms and at least one cover leaf. Two curved arms extend down from the cover bracket body. Each arm has a semicircular end, an outer edge and a positive stop formed on the outer edge. The body bracket has a transverse bracket body, two wings and at least one body leaf. The transverse bracket body has an outer edge and two ends, and the two ends are bent upward to form the two wings. Two pivot pin holes are respectively formed though the two wings and the two ends of the arms. At least one body leaf is formed around the body bracket. The hinge pin extends through the pivot pin holes to connect the cover bracket to the body bracket.

4 Claims, 6 Drawing Sheets

BARBECUE GRILL HINGE ASSEMBLY

BACKGROUND OF THE INVENTION

1. Field of the Invention

The present invention relates to a barbecue (BBQ) grill hinge assembly, and more particularly to a hinge assembly with a positive stop and the positive stop stops cover from opening more than a specific angle with respect to the grill body.

2. Description of Related Art

With reference to FIG. 6, a conventional barbecue (BBQ) grill (60) comprises a hinge assembly (not numbered), a lip (66), a cover (62) and a grill body (64). The lip (66) is securely formed on the grill body (64), and the lip allows the cover (62) to be mounted securely on the grill body (64). The hinge assembly comprises a hinge pin (600), cover knuckles (620) and a body knuckle (642). The cover knuckles (620) are attached securely to the cover (62), and a transverse pivot hole (not numbered) is formed through each cover knuckle (620). The body knuckle (642) is attached securely to the body (64), and a transverse pivot hole (not numbered) is formed through the body knuckle (642) and aligns with the transverse pivot holes in the cover knuckles (620). The hinge pin (600) rotatably connects the cover knuckles (620) and the body knuckle (642) by extending through the transverse pivot holes in the cover knuckles (620) and the body knuckle (642). Therefore, the cover (62) of the BBQ grill (60) can be opened with respect to the grill body by means of the hinge assembly. The disadvantage of the conventional hinge assembly for the BBQ grill is that the angle to which the cover (62) opens with respect to the grill body (64) is uncontrollable. When the cover (62) is opened with respect to the grill body (64) based on the hinge assembly, the cover (62) cannot be held at a certain opening angle. Therefore, the cover (62) either falls back to the covered position on the grill body (64) or swings completely open until the cover strikes the body of the grill. The weight of the cover (62) can easily tip the grill body (64) over and damage the grill or ruin food cooking on the grill. Moreover, attaching the conventional hinge assembly to the BBQ grill (60) requires cutting away a section of the lip (66) of the BBQ grill (60). In other words, the structure of the BBQ grill must be modified before the hinge assembly can be attached. If the BBQ grill (60) has an irregular shape, the conventional hinge assembly may be difficult or impossible to attach to the grill.

To overcome the shortcomings, the present invention provides a hinge assembly for a BBQ grill to mitigate or obviate the aforementioned problems.

SUMMARY OF THE INVENTION

The primary objective of the present invention is to provide a barbecue (BBQ) grill hinge assembly that fits on a BBQ grill of any shape and can be held open at a specific angle.

To accomplish the objective of the invention, the BBQ grill hinge assembly in accordance with the present invention has a cover bracket, a body bracket and a hinge pin to pivotally connect the cover bracket to the body bracket. The cover bracket has a positive stop, and the body bracket has a bracket body with a positive stop. When the BBQ grill cover is opened with respect to the grill body, the cover stops at a certain angle because the positive stop is stopped at the positive stop.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
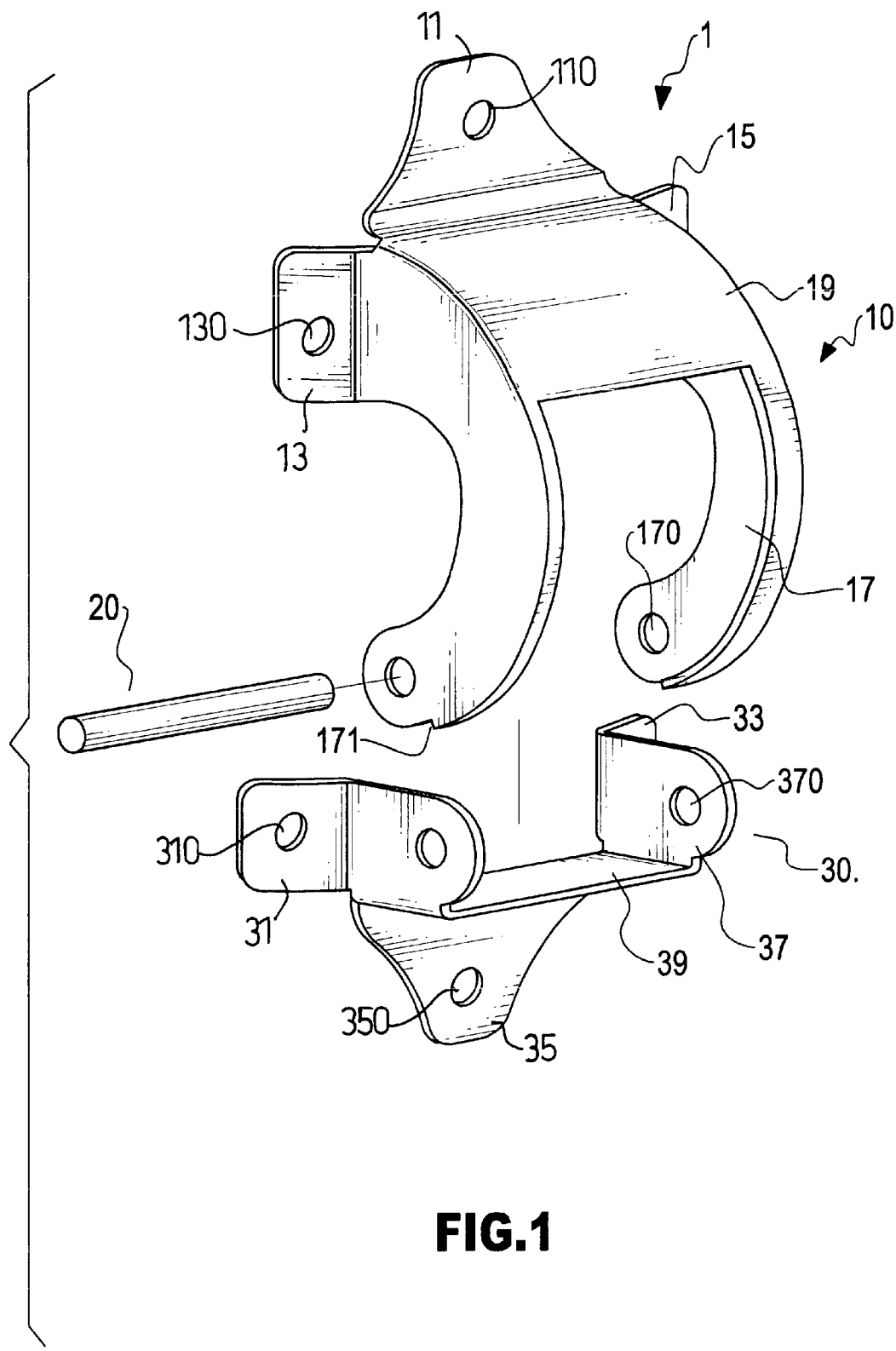
FIG. 1 is an exploded perspective view of a barbecue (BBQ) grill hinge assembly in accordance with the present invention.

With reference to FIG. 1, a barbecue (BBQ) grill hinge assembly (1) in accordance with the present invention comprises a cover bracket (10), a body bracket (30) and a hinge pin (20). The cover bracket (10) has a top (not numbered), a bottom (not numbered) and two sides (not numbered) and comprises a cover bracket body (19), two arms (17) and at least one cover leaf (11, 13, 15). The cover bracket body (19) has two sides, a bottom and a curved face and is formed at the top of the cover bracket (10) and extends down. The two arms (17) are curved, respectively extend down from opposite sides of the cover bracket body (19) and have a semicircular distal end (not numbered), an outer edge (not numbered), a positive stop (171) a pivot pin hole (170). The pivot pin holes (170) respectively extend through the ends of the two arms (17), and two positive stops (171) respectively formed on the two outer edges of the two arms (17) near the ends. At least one cover leaf (11, 13, 15) is formed at an edge the cover bracket body (19), and each of the least one cover leaves (11, 13, 15) has one through hole (110, 130, 150).

The body bracket (30) comprises a transverse bracket body (39), two wings (37) and at least one body leaf (31, 33, 35). The bracket body (39) has an outer edge (not numbered) and two ends (not numbered). The two ends bend upward and form two wings (37), and the each of wings (37) has a pivot pin hole (370). At least one body bracket leaf (31, 33, 35) is formed at edges of the bracket body (39), and each of the at least one body leaf (31, 33, 35) has a through hole (310, 330, 350).

Figure 2:
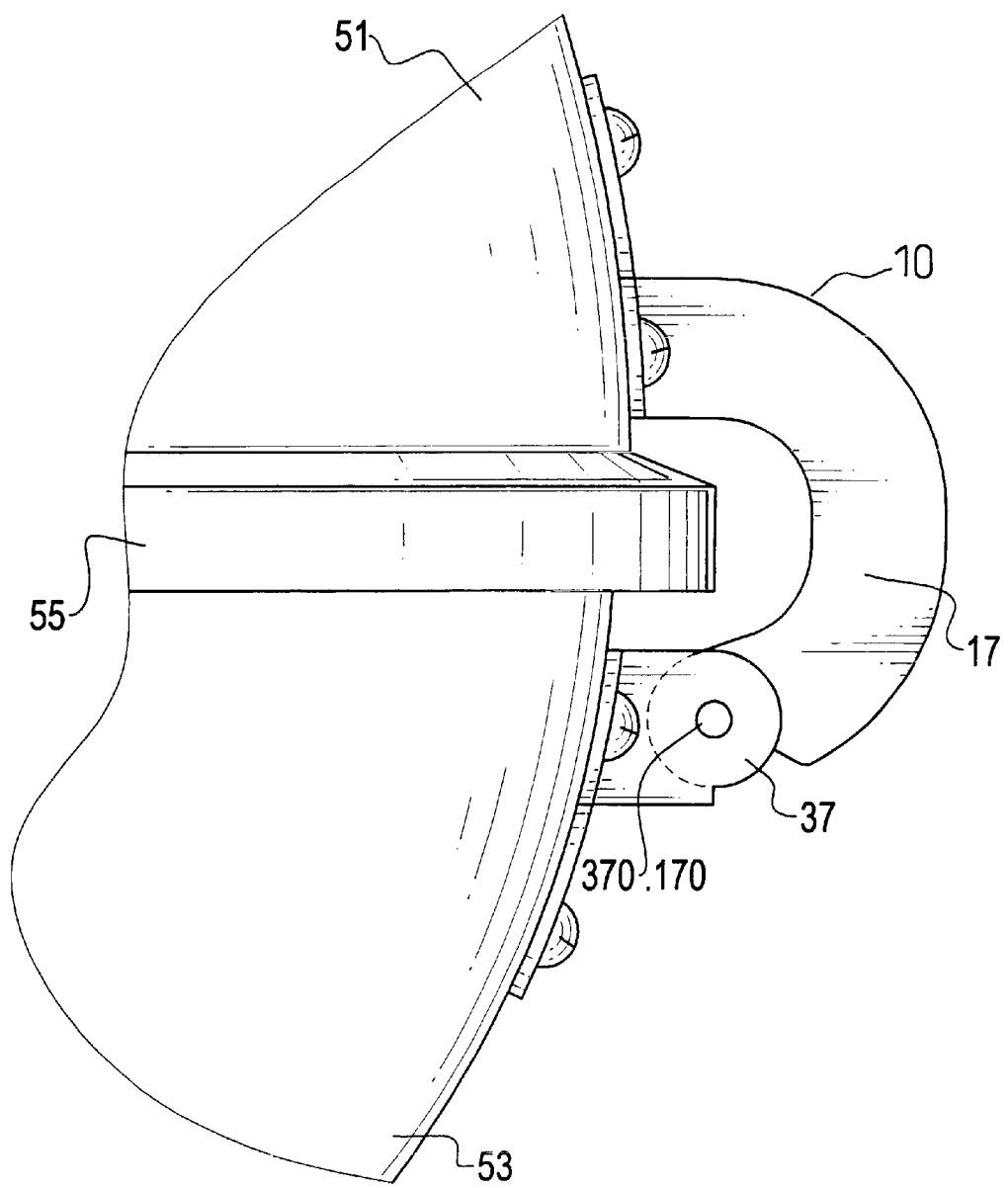
FIG. 2 is a side plan view of the hinge assembly in FIG. 1 attached to a BBQ grill with the cover closed on the grill body.

With reference to FIG. 2, a barbecue (BBQ) grill (50) comprises a cover (51), a grill body (53) and a lip (55). The grill body (53) has an open top (not numbered), an inside (not shown) and an outside (not numbered). The lip (55) is formed around the top of the outside of the grill body (53). The cover bracket (10) is securely attached to the cover (51), and the body bracket (30) is securely attached to the grill body (53). The hinge pin (20) is passed though the through holes (370, 170) in the wings (37) of the body bracket (30) and the arms (17) of the cover bracket (10) to pivotally connect the cover bracket (10) to the body bracket (30).

Figure 3:
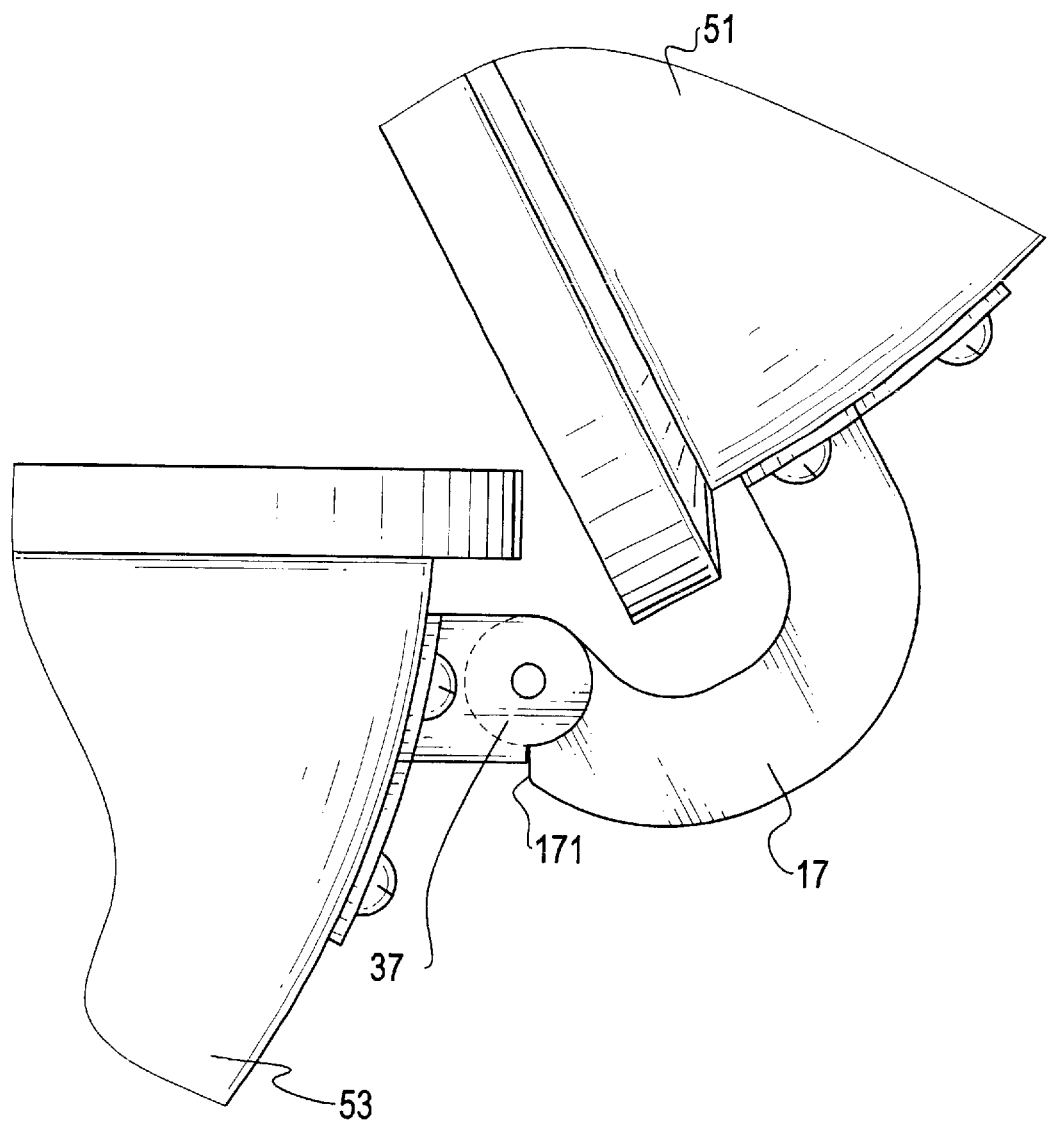
FIG. 3 is a side plan view of the hinge assembly in FIG. 1 attached to a BBQ grill with the cover open to a predetermined angle with respect to the grill body.

With reference to FIG. 3, the positive stop (17) abuts the outer edge of the bracket body (37) when the cover (51) is opened with respect to the grill body (53) and stops the cover (51) from opening any further. Therefore, the cover (51) stops at a specific angle with respect to the grill body (53).

Figure 4:
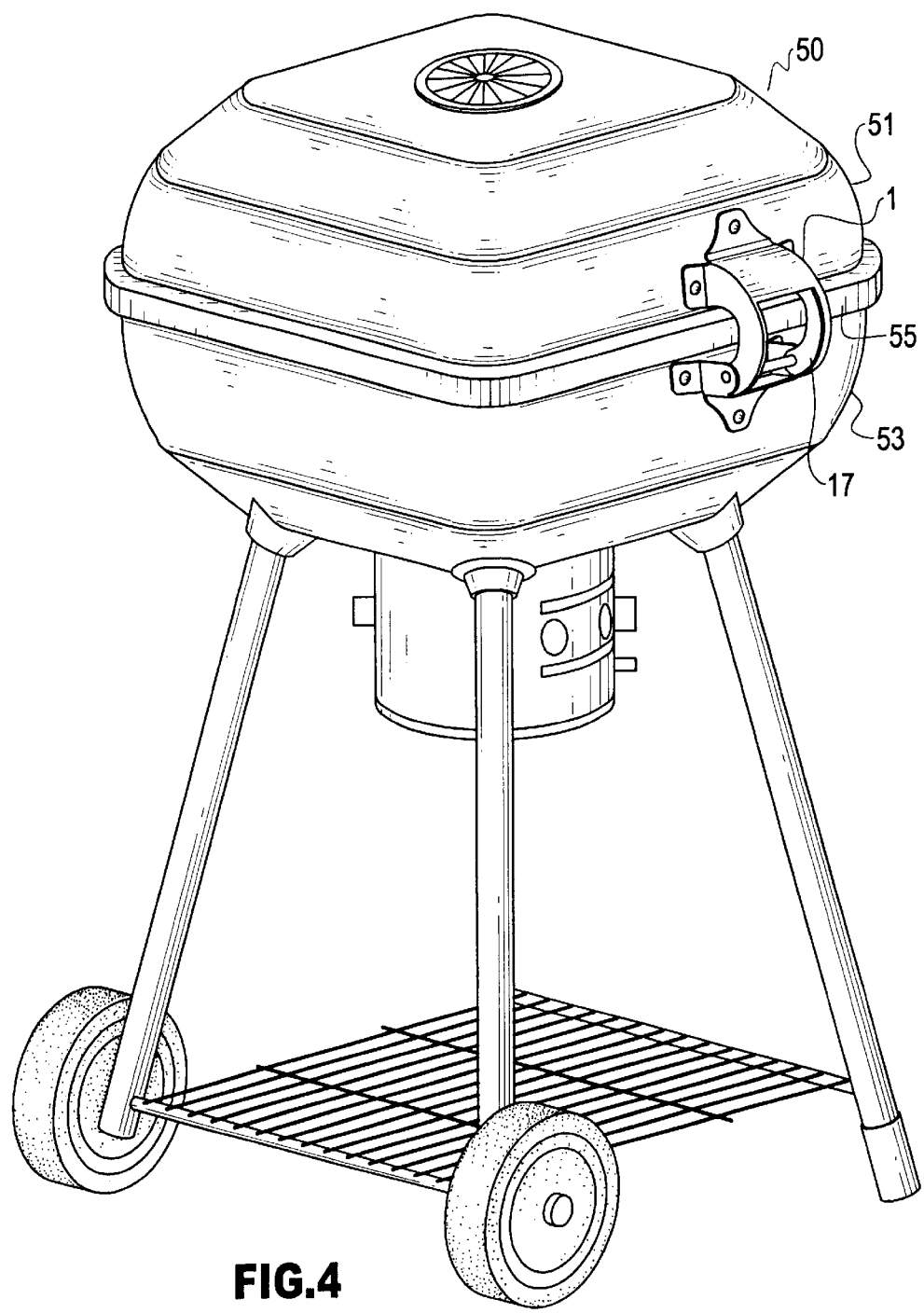
FIG. 4 is a perspective view of the hinge assembly in FIG. 1 attached to a rectangular BBQ grill.
Figure 5:
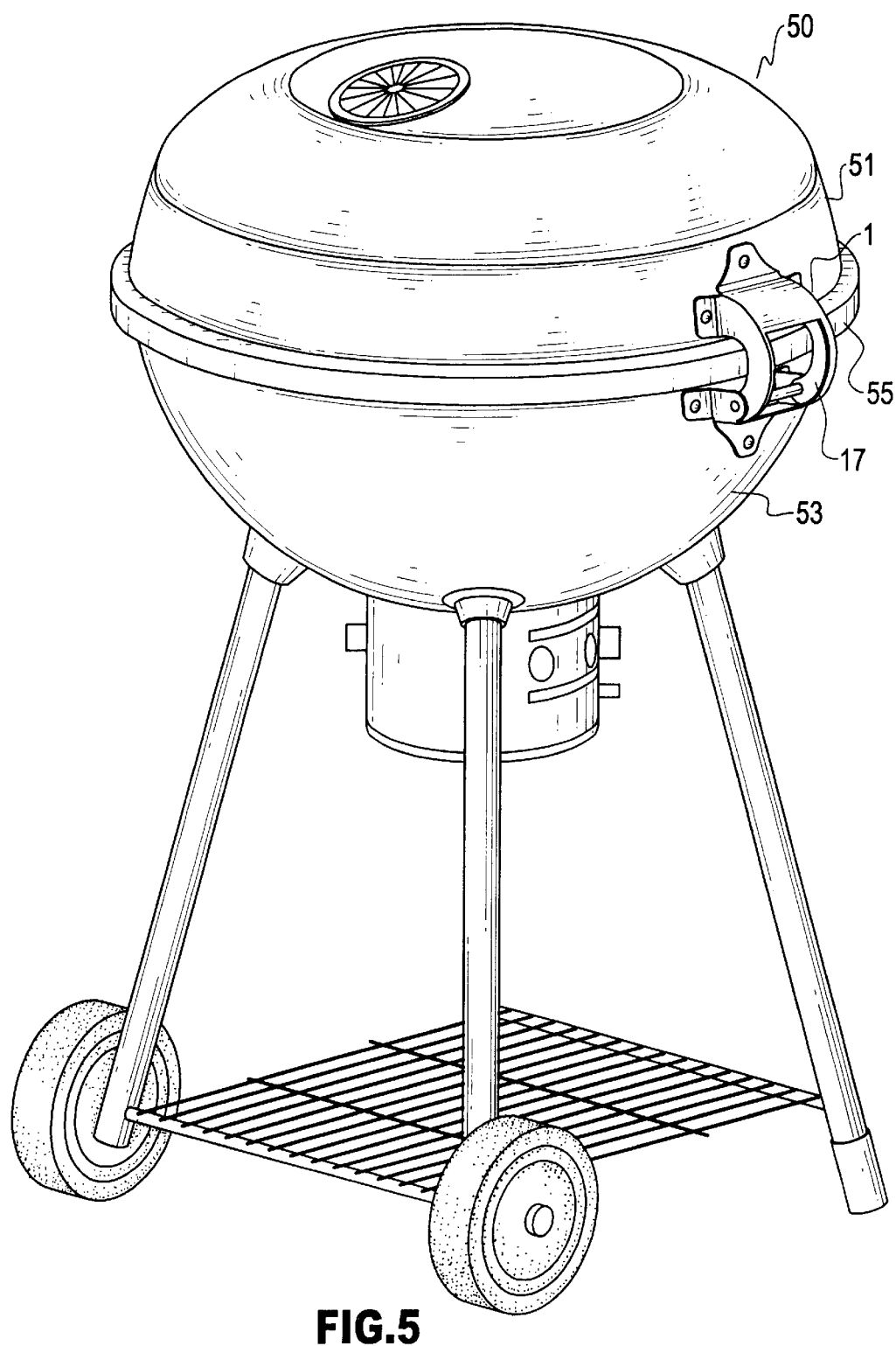
FIG. 5 is a perspective view of the hinge assembly in FIG. 1 attached to a round BBQ grill.
Figure 6:
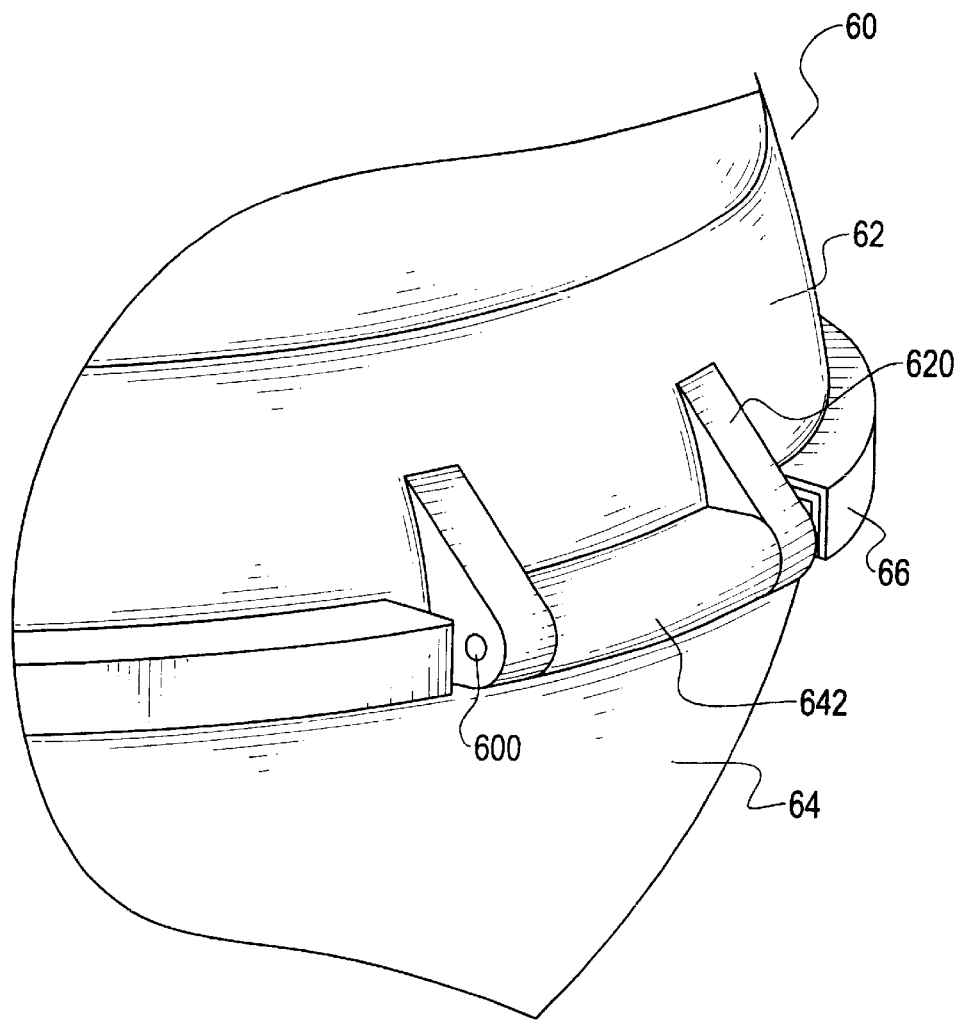
FIG. 6 is a perspective view of a conventional BBQ grill hinge assembly in accordance with the prior art.

With reference to FIGS. 4 and 5, the hinge assembly (1) can be used on a round BBQ grill or a rectangular BBQ grill (50) because of the curved arms (17). The curved arms (17) allow the hinge assembly to be attached to any shape of BBQ grill without having to cut away a part of the lip (55).

The advantages of the BBQ grill hinge assembly (1) includes the hinge assembly (1) fitting on any shape of the BBQ grill and being able to hold the cover (51) open at a specific angle. Therefore, opening the cover (51) is less likely to tip over the BBQ grill.

It is to be understood that even though numerous characteristics and advantages of the present invention have been set forth in the foregoing description together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A barbecue (BBQ) grill hinge assembly for a barbecue grill having a cover, a grill body and a lip, the grill body comprising a top and the lip formed around the top of the grill body, and the BBQ grill hinge assembly comprising;

a cover bracket having a top, a bottom and two sides and comprising;

a cover bracket body with two sides, a bottom and a curved face and formed at the top of the cover bracket;

two curved arms extending down from opposite sides of the cover bracket body and respectively having an outer edge, a semicircular end, a positive stop formed in the outer edge and a pivot pin hole near the semicircular end; and at least one cover leaf formed around the cover bracket body and adapted to attach the cover bracket body to the BBQ grill cover;

a body bracket comprising;

a transverse bracket body having two ends and an outer edge; the two ends bent up and forming two wings respectively having a pivot pin hole; and at least one body leaf formed around the body bracket; and a hinge pin passing through the pivot pin holes in the arms of the cover bracket and the wings of the body bracket to pivotally connect the cover bracket to the body bracket, whereby when the cover bracket is opened with respect to the body bracket, the positive stops of the cover bracket are stopped by the outer edge of the transverse bracket body at a specific angle.

2. The barbecue grill hinge assembly as claimed in claim 1, wherein each of the at least one cover leaf has a through hole.

3. The barbecue grill assembly as claimed in claim 1, wherein each of the at least one body leaf has a through hole.

4. The barbecue grill assembly as claimed in claim 2, wherein each of the at least one body leaf has a through hole.

* * * * *